F. G. KLECKLER.
BELT SHIFTER.
APPLICATION FILED MAY 22, 1918.
1,293,472.
Patented Feb. 4, 1919.
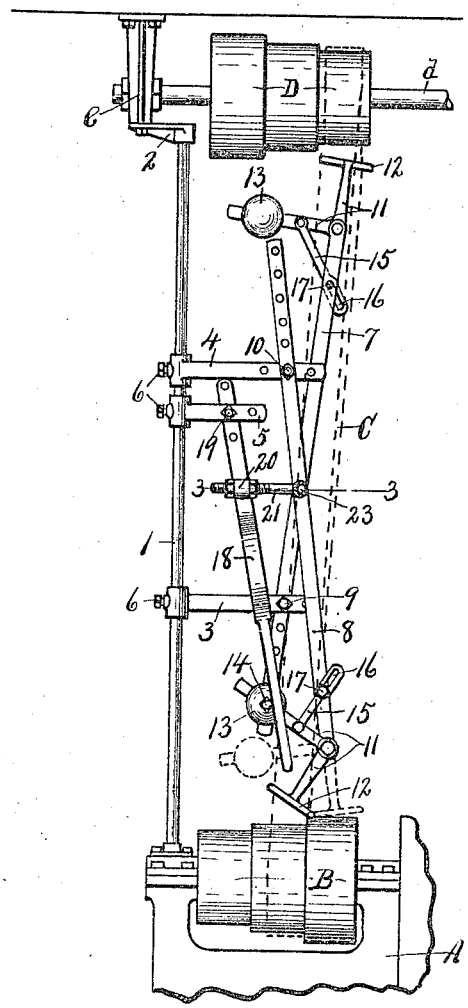
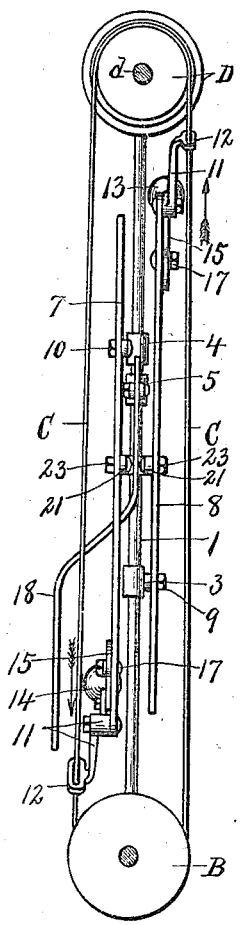
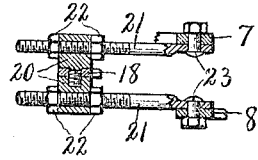
INVENTOR
F. G. Kleckler
BY
Howard P. Hinson
ATTORNEY.

UNITED STATES PATENT OFFICE.

FRANK G. KLECKLER, OF BATH, NEW YORK.

BELT-SHIFTER.

1,293,472.  Specification of Letters Patent.  Patented Feb. 4, 1919.

Application filed May 22, 1918. Serial No. 235,961.

*To all whom it may concern:*

Be it known that I, FRANK G. KLECKLER, a citizen of the United States of America, and resident of Bath, in the county of Steuben, in the State of New York, have invented new and useful Improvements in Belt-Shifters, of which the following, taken in connection with the accompanying drawings, is a full, clear, and exact description.

This invention relates to certain improvements in belt shifters adapted to be used more particularly for shifting the belt to and from the different diameters of cone pulleys for changing the speed of the driven member, it being understood that the side of the belt approaching either pulley is engaged by the shifter near that pulley to first shift from the larger to the smaller cone and then to shift the opposite end of the belt from the smaller to the larger cone which may be alined with the first named smaller cone.

The primary object of my present invention is to provide simple means whereby these successive shifts may be made in a single operation so that when one end of the belt is shifted from a larger to a smaller diameter of the corresponding cone-pulley, the opposite end will be automatically shifted from the smaller to the larger diameter of the adjacent pulley in alinement with that portion of the first named pulley to which the belt was previously shifted to.

Other objects and uses relating to specific parts of my invention will be brought out in the following description.

In the drawings—

Figures —1— and —2— are respectively a side elevation and an end view of my invention as applied to cone-pulleys of a lathe or other machines.

Fig. —3— is a detail sectional view taken on line 3—3, Fig. —1—.

In order that my invention may be clearly understood I have shown a portion of a lathe head —A— having a cone pulley —B— connected by a belt —C— to an over head cone pulley —D— which is secured to a countershaft —d— the latter being supported in one or more hangers —e—.

A vertical guide rod —1— at one end of the pulleys —B— and —D— is secured at its lower end to the head —A— and has its upper end secured to a bracket —2— on the hanger —e—, said rod being disposed in a direct line between the axes of the pulleys as shown more clearly in Fig. —2—.

A series, of in this instance, —3— laterally projecting arms —3—, —4— and —5— are adjustably mounted in different horizontal planes upon the rod —1— and are held in their adjusted positions by set screws —6—.

A pair of shifting levers —7— and —8— are pivoted at —9— and —10— to the arms —3— and —4— respectively and are each provided with a pivoted bell-crank section —11— having one arm equipped with a belt engaging loop —12— and its other arm provided with an adjustable weight —13— held in place by a set screw —14—.

The weighted arms of the bell-crank sections —11— are connected with limited or lost motion by means of links —15— to their respective levers —7— and —8—, each link having a slot —16— for receiving a pin —17— on the adjacent lever to limit the rocking movement of the corresponding bell-crank section in either direction, the opposite bell-crank sections and their links being reversely arranged for a purpose presently described.

It will be observed upon reference to Fig. —1— that the levers —7— and —8— are disposed in intersecting planes and that they cross each other substantially midway between the arms —3— and —4—, the lever —7— for shifting the upper portion of the belt being fulcrumed on the lower arm —3— while the lever —8— for shifting the lower portion of the belt is fulcrumed on the upper arm —4—.

Suitable means is provided for operating these levers —7— and —8— simultaneously, said means consisting of a hand lever —18— fulcrumed near one end at —19— to the arm —5— and provided with opposite heads —20— pivoted thereto coaxially.

These heads are provided with bolt openings therethrough for receiving the threaded ends of suitable bolts —21— which are rigidly secured thereto by nuts —22— to enable them to be adjusted, the free ends of said bolts being pivotally connected by rivets —23— to their respective levers —7— and —9— at points substantially coincident with their points of intersection so that when the lever —18— is operated motion will be transmitted to both of the levers —7— and —8— simultaneously in the same direction.

The levers —7—, —8— and —18— and their supporting arms —3—, —4— and —5— are provided with a plurality of bolt openings for receiving their respective pivotal bolts and permitting them to be adjusted to give the desired movement for shifting the belt from one diameter to another of the cone-pulleys.

The object of the weighted bell-crank sections —11— and their slotted links —16— is to allow the first shift for one end of the belt to be made in advance of the shifting of the opposite end of the belt by a single movement of the operating lever —18— in one direction and to place the bell-crank section for the last named end under tension or force of its weight so that it may automatically complete the shifting of said belt.

For example, assuming that the upper portion of the belt has been shifted to the position shown by dotted lines Fig. —1— by rocking the lever —18— and shifting levers —7— and —8— connected thereto, to the right, under which conditions the resistance of the belt acting upon the shifter arm of the upper bell-crank —11— aided by the weight —14— will cause the upper end of the slot —16— of the adjacent link —15— to engage the corresponding pin —17— and thereby move the bell-crank lever —11— bodily with the lever —7—. On the other hand the resistance of the belt acting upon the shifter arm of the lower bell-crank lever —11— will effect an independent upward rocking movement of said bell-crank lever against the action of its weight —13— before the lower end of the slot —16— of the adjacent link —15— engages its pin —17— whereupon the weight —13— will automatically exert its force upon the lower lever —11— and cause the latter to shift the lower end of the belt to the right upon the next larger diameter of the adjacent pulley which is alined with that to which the upper end of the belt has been previously shifted.

By reversing the operation of the hand lever —18— will reverse the operation of the levers —7— and —8— and their bell-crank levers —11— so that the lower bell-crank will operate first and be followed by the operation of the upper bell-crank. In this manner the belt may be shifted to and from any number of cones or different diameters of the pulleys —B— and —D— by a corresponding movement of the hand-lever —13— in the direction of the shift desired.

What I claim is:

1. In combination with a belt connecting two cone pulleys, a pair of belt-shifting levers one for each pulley, crossing each other between the pulleys and fulcrumed at points beyond the crossing, a hand lever having link-connection with the first named levers near the crossing, bell-cranks pivoted to the first named levers and each having one arm engaging the belt and its other arm weighted, and links connecting the weighted arms to their respective levers with a lost motion.

2. The combination with a belt connecting two cone pulleys, of a pair of belt-shifting levers, one for each pulley, weighted bell-cranks pivoted to said levers and provided with belt engaging loops, links connecting said bell-cranks to their respective levers with a lost motion, and means for rocking both levers simultaneously.

3. The combination with a belt connecting two cone pulleys, of a belt-shifter comprising an upright guide having laterally projecting arms, levers pivoted to said arms and provided with yielding belt-engaging members, means whereby said levers may be adjusted longitudinally to conform to different spacings of the pulleys from each other, and means for rocking said levers simultaneously.

In witness whereof I have hereunto set my hand this 16th day of May 1918.

FRANK G. KLECKLER.

Witnesses:
CHESTER A. FEIG,
HENRY J. WEHNEAN.